United States Patent Office 3,740,236
Patented June 19, 1973

3,740,236
PARTIALLY DEFATTED NUT COATING AND RECONSTITUTING PROCESS
James R. Baxley, Edenton, N.C., assignor to Peanut Research & Testing Laboratories, Inc., Edenton, N.C.
No Drawing. Continuation of abandoned application Ser. No. 739,160, Jan. 24, 1968. This application Apr. 15, 1971, Ser. No. 134,395
Int. Cl. A23l 1/36
U.S. Cl. 99—126                                   2 Claims

ABSTRACT OF THE DISCLOSURE

Nuts which have had a substantial portion of their oils removed by hydraulic pressing are reconstituted in an aqueous coating solution which is proportional to the amount of nuts being reconstituted. The solution reconstitutes the nuts to their original configuration and, at the same time, applies a coating which binds and seals the outer surface of the nut, controls the quantity of water absorbed by the nut and adds flavor and coloring to the nut. The aqueous solution is comprised of water and dextrin in proportioned amounts and a dry powdered coating is added comprised of salt, monosodium glutamate, yeast extract, starch, dextrin, herbs and spices.

---

This application is a continuation of application Ser. No. 739,160, filed Jan. 24, 1968 and now abandoned.

BACKGROUND OF THE INVENTION

(1) Field of the invention

The invention relates generally to partially defatted nuts and more particularly is directed towards a novel process for preparing partially defatted nuts and includes a novel solution which reconstitutes the nut while binding and sealing the surface in addition to preparing it for a coating composition.

(2) Description of the prior art

In U.S. Pats. Nos. 2,003,415 and 3,294,549 there is disclosed a process for reducing the calorie content of nuts by pressing the nuts under high pressure so as to separate the oil from the nut meat. The nut meats are then reconstituted to more or less their original size and shape, primarily by applying steam to the nuts or immersing them in water. This process is capable of removing up to 80% or so of the oil from the peanuts and the resulting low calorie nut is a desirable item for those who have a preference for nuts but are concerned about the normally high calorie content.

Despite the low calorie content of nuts produced by the above process, the product has found only limited acceptance by processors and consumers because of several deficiencies. First of all, the nuts presently produced lack good flavor. The roasted peanut flavor appears to be reduced in proportion to the percentage of the peanut oil removed during the pressing process. Also, the reconstituted nuts are different in texture and mouth feel than natural nuts and this is partially due to the reduced lubricity of the partially defatted nuts. It has also been found that reconstitution of the nuts in boiling water, as is usually done, results in a hard, chalky texture. Defatted nuts heretofore available also lack good color and appearance and the roasted products are usually very light in color rather than the typical golden brown of roasted full fat peanuts. Their appearance is made more unattractive because of stress cracks which develop during the pressing step. The peanut halves or cotyledons separate more readily into splits during processing and handling, whereas whole peanuts are usually considered more attractive or appealing and command a higher price. Finally, the product has a relatively short shelf life as compared with roasted full fat peanuts, these nuts having a strong tendency to becoming rancid within a short time despite various precautions and packaging.

Accordingly, it is a general object of the present invention to provide improvements in partially defatted nuts. A more specific object of the invention is to improve the flavor, texture, mouth feel, color, appearance and shelf-life of partially defatted nuts. Another object of the invention is to provide an improved process for reconstituting partially defatted nuts.

SUMMARY OF THE INVENTION

This invention features a novel coating and process for reconstituting, coating and binding partially defatted nuts. The coating is an edible, air-impervious adhesive substance that binds to and seals the nut. The process includes the step of reconstituting measured amounts of nuts with proportionately measured amounts of an aqueous binder solution whereby the nuts absorb the water content of the solution in a controlled and limited manner while the surface of the nut is coated by the binder portion of the solution. The binder seals the surface of the nut, greatly extending the shelf-life of the nuts and prepares the nut surface for the application of a coating composition which improves the flavor, color and appearance of the nuts.

BRIEF DESCRIPTION OF THE PREFERRED EMBODIMENT

By way of introduction, the process of producing partially defatted nuts as taught by the foregoing patents consists essentially of three operations. These are (1) pressing, (2) reconstituting and (3) drying and roasting. Either raw nuts together with their skins, or blanched nuts are typically pressed in hydraulic presses to remove the desired amount of oil. The pressed and mis-shapen nuts are then heated in boiling water to expand or restore them more or less to their original size and shape. Salt and other ingredients are then added during the expansion step. The expanded nuts are then dried and roasted with or without oil. The reconstitution by immersion in boiling water does not control the amount of water absorbed by the nuts and, as a result, the nut produced is usually hard and chalky in texture. Also the nut which is produced by this process tends to become rancid in a very short time despite the addition of anti-oxidants and other preservatives.

The process of the present invention involves spraying, pouring or otherwise combining a measured amount of an aqueous binder solution with a measured amount of pressed nuts, such as peanuts, preferably while they are tumbling either in a batch mixer or in a continuous flow mixer, for example, such that the proportion of binder solution to nuts remains substantially constant. A mixer that provides thorough yet gentile mixing action is preferred and revolving coating pans are ideal for this purpose. Mixing should continue until the desired moisture penetration and surface tackiness is achieved and this usually takes place within three to five minutes. At this stage, the nuts are partially reconstituted with major portions of the reconstitution occurring during subsequent roasting, as in oil, where the nuts return to their original shape and approximately 25% greater than their original size.

The preferred binder solution, according to the invention is comprised of water and a glucose polysaccharide such as dextrin and best results have been obtained using a solution of 80% water and 15% dextrin. The proportion of nuts to binder solution which has been found to produce the best results is 83–84% raw partially defatted nuts and 8–9% binder solution. The balance of 8% is made up of a dry powdered coating which is added at the last step. The dry powdered coating mixture is applied preferably by sifting or dusting over the tumbling nuts and mixing continues until all of the coating mixture has been uniformly distributed over the nuts and has become completely wetted. Complete wetting of the coating is critical since a dry coating does not develop the desired color or flavor or bond satisfactorily to the nuts.

An alternate method of applying the dry powdered coating is preferred. In the alternate method, the salt portion is added last, i.e. sifting or dusting the mixture of monosodium glutamate, starch, dextrin, yeast extract, herbs and spices and mixing until the coating is wetted, then sifting or dusting on the desired quantity of salt. Mixing is continued until the salt is thoroughly adhered to the nuts.

The salt crystals thus do not become completely dissolved and assist in keeping the nuts sufficiently separated to reduce the tendency to fuse together during roasting.

Another alternate but less preferred method for applying the coating is by combining it with the binder solution to form a slurry which is then applied to the nuts. Temperatures of the pressed nuts, binder solution, and dry coating are not critical but for optimum results all three should be at or near room temperature.

The coated nuts are next oil roasted or dry roasted. If oil roasting is followed a submerging basket or conveyor, for example, must be used to keep the light weight nuts from floating in the roasting oil. If the nuts are dry roasted they may be stirred or mixed during the beginning of the roasting, to prevent the nuts from adhering to one another as the coating dries, although this is not critical.

Best results have been achieved with a dry powdered coating composition made up of 50% salt, 10% monosodium glutamate (MSG) which is the single sodium salt of glutamic acid, 2% yeast extract, 20% starch, 17.75% dextrin, and 0.25% herbs and spices (equal parts of ground rosemary, savory, tarragon and thyme).

The flavor of the reconstituted partially defatted nuts is greatly improved by increasing the levels of monosodium glutamate and salt above that normally used in salted nuts and other foods and by changing the monosodium glutamate-salt ratio normally used. Whereas a salt content of 2.5%–3.5% is normal for most salted nuts, a salt level of up to 6% on partially defatted nuts has been found acceptable, although a level of 4 to 5% is preferred. A monosodium glutamate-salt ratio 1 to 12 is normal for most food products using MSG whereas with partially defatted nuts a ratio of 1 to 5 is preferred. The flavor is also improved by incorporating protein hydrolysates or yeast extracts, with the latter being preferred. Flavor is also improved by incorporating the herbs and spices rosemary, savory, tarragon and thyme. Flavor may be further improved by incorporating the seasoning ingredients in the surface coating to provide a more rapid flavor impact or release when the nuts are eaten.

The texture of the nuts will be found to be improved by the present process since the quantity of water used is controlled as compared to the previous practice by which the nuts are reconstituted by immersion in massive quantities of boiling water. The water is added to the pressed nuts as part of the binder solution prior to the coating and roasting. The texture may be selectively varied from soft to crisp to hard by increasing the percentage of water in the binder solution.

The coating that results from the foregoing, serves a number of functions. First of all, the color and appearance of the nuts are improved by means of the surface coating which covers the lighter colored roasted nuts. The color is developed during roasting by the Maillard reaction between the monosodium glutamate and the dextrin. This color can range from light tan to brown depending upon the type of dextrin used. The appearance is also improved in that the stress cracks produced during the pressing step are covered by the coating. The appearance of the nuts is also enhanced by reason of the excellent uniformity and adhesion provided by the coating.

In addition to improving the appearance and flavor of the nuts, the binding action of the coating also reduces the separation of the peanut halves, or cotyledons, because of the binding action of the coating which forms an integrated encapsulating skin about the nut.

The product stability or shelf-life of the nut is greatly improved by reason of the sealing action of the coating. The coating provides an edible, air-impervious barrier which also binds the nut halves together and serves as a vehicle for flavorings, etc.

Shelf-life may be further improved by incorporating anti-oxidants if the nuts are dry roasted, or by using high stability frying oils, with or without anti-oxidants, if the nuts are oil roasted.

For a dry roasted product the anti-oxidants can be added prior to roasting by incorporating them in the binder solution or in the dry powdered coating. Anti-oxidants such as BHA (butylated hydroxyanisole) and BHT (butylated hydroxytoluene) are partially removed during roasting and an excess may be used in the amount that will provide the desired residual content within maximum levels permitted by law. For oil roasting the anti-oxidants can be added as for dry roasting or incorporated in the frying oil. Alternately, the anti-oxidants may be applied after roasting as by spraying onto the nuts.

While the invention has been described with reference to the preferred embodiment it will be understood that this has been done only by way of example and not in a limiting sense. Numerous modifications will appear to those skilled in the art without departing from the invention. For example, flavorings may be changed according to the taste desired and certain equivalent substances may be employed in place of those specified. Also, while specific ratios have been given the preferred example, these may be modified to some extent without departing from the spirit of the invention.

Having thus described the invention what I claim and desire to obtain by Letters Patent of the United States is:

1. The process of simultaneously reconstituting and coating pressed and partially defatted edible whole nuts, comprising the steps of
   (a) combining said pressed whole nuts and an aqueous binder solution in predetermined and controlled proportions of about eight parts of nuts to one part of solution by weight for a time sufficient for said nuts to absorb substantially all of said solution and simultaneously to be wholly covered by a sealing coating formed by said solution,
   (b) said binder solution comprised of water and dextrin in proportions of substantially four parts of water to one part of dextrin by weight.

2. The process of claim 1 including the step of applying a dry powdered coating to said nuts after they have been covered by said sealing coating wherein said dry powdered coating includes salt and monosodium glutamate in a five to one weight ratio, and wherein the proportion of nuts to binder solution to dry powdered coating is substantially eight to one to one by weight.

References Cited

UNITED STATES PATENTS

| | | | |
|---|---|---|---|
| 1,546,606 | 7/1925 | Pape | 99—126 |
| 2,003,415 | 6/1935 | Ammann | 99—126 |
| 2,020,533 | 11/1935 | Zuloow | 99—126 UX |
| 2,278,467 | 4/1942 | Musher | 99—126 |
| 2,278,941 | 4/1942 | Musher | 99—126 |
| 2,218,713 | 10/1940 | Kelly | 99—126 |
| 3,427,858 | 11/1969 | Wells | 99—126 |
| 3,527,046 | 9/1970 | Sheick | 99—166 |
| 3,294,549 | 12/1966 | Vix | 99—126 |

FOREIGN PATENTS

| | | | |
|---|---|---|---|
| 518,493 | 2/1940 | Great Britain | 99—126 |

FRANK W. LUTTER, Primary Examiner

R. MULPAR, Assistant Examiner